(12) United States Patent
Yan et al.

(10) Patent No.: US 9,419,527 B2
(45) Date of Patent: Aug. 16, 2016

(54) REGULATION FOR POWER SUPPLY MODE TRANSITION TO LOW-LOAD OPERATION

(71) Applicant: iWatt Inc., Campbell, CA (US)

(72) Inventors: Liang Yan, Milpitas, CA (US); John William Kesterson, Seaside, CA (US); Xiaoyan Wang, Milpitas, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 0 days.

(21) Appl. No.: 13/772,202

(22) Filed: Feb. 20, 2013

(65) Prior Publication Data

US 2013/0235621 A1    Sep. 12, 2013

Related U.S. Application Data

(60) Provisional application No. 61/608,031, filed on Mar. 7, 2012.

(51) Int. Cl.
*H02M 3/335*    (2006.01)
*H02M 1/00*    (2006.01)

(52) U.S. Cl.
CPC .. *H02M 3/33507* (2013.01); *H02M 2001/0032* (2013.01); *Y02B 70/16* (2013.01)

(58) Field of Classification Search
CPC ................ H02M 3/33507; H02M 2001/0032; Y02B 70/16
USPC ............................................ 363/21.08–21.18
See application file for complete search history.

(56) References Cited

U.S. PATENT DOCUMENTS

| | | | |
|---|---|---|---|
| 7,492,619 B2 | 2/2009 | Ye et al. | |
| 8,018,743 B2 | 9/2011 | Wang et al. | |
| 8,094,468 B2 | 1/2012 | Yang et al. | |
| 2005/0073862 A1* | 4/2005 | Mednik et al. | 363/20 |
| 2008/0037293 A1* | 2/2008 | Jacques et al. | 363/21.03 |
| 2008/0049457 A1 | 2/2008 | Choi et al. | |
| 2010/0165672 A1 | 7/2010 | Li et al. | |
| 2010/0315838 A1* | 12/2010 | Mao et al. | 363/16 |

(Continued)

FOREIGN PATENT DOCUMENTS

CN     102097960 A     6/2011
JP     2008-092712 A    4/2008

(Continued)

OTHER PUBLICATIONS

Chinese First Office Action, Chinese Application No. 201310077474.1, Dec. 19, 2014, 8 pages. (with concise explanation of relevance).

(Continued)

*Primary Examiner* — Jue Zhang
(74) *Attorney, Agent, or Firm* — Fenwick & West LLP

(57) ABSTRACT

A switching power converter includes a controller configured to transition from a first operating mode to a second operating mode by determining the operating conditions at the transition point between the operation modes. The controller uses a point where a switch included in the power converter would have been turned on if operating under the first operating mode as a reference point to determine when to turn on the switch under the second operating mode. Using the reference point, the switching power converter determines a control period for regulating the switching period of the switch in a second operating mode.

14 Claims, 5 Drawing Sheets

(56) References Cited

U.S. PATENT DOCUMENTS

2011/0194315 A1   8/2011   Gaknoki et al.
2012/0081084 A1*  4/2012   Yang et al. .................. 323/235

FOREIGN PATENT DOCUMENTS

| KR | 10-2009-0132497 A | 7/2011 |
| KR | 10-2011-0098000 A | 8/2011 |
| TW | 201034353 A | 9/2010 |
| TW | 201108576 A | 3/2011 |
| TW | 201113531 A | 4/2011 |
| TW | 201115898 A | 5/2011 |

OTHER PUBLICATIONS

Korean Office Action, Korean Application No. 10-2013-0024681, Aug. 25, 2014, 7 pages.

Taiwan Office Action, Taiwan Application No. 102107919, Oct. 3, 2014, 10 pages.

Chinese Second Office Action, Chinese Application No. 2013100774741, Aug. 31, 2015, 7 pages.

* cited by examiner

REGULATION FOR POWER SUPPLY MODE TRANSITION TO LOW-LOAD OPERATION

CROSS REFERENCE TO RELATED APPLICATION

This application claims priority under 35 U.S.C. §119(e) from co-pending U.S. Provisional Patent Application No. 61/608,031, filed on Mar. 7, 2012, which is incorporated by reference herein in its entirety.

BACKGROUND

1. Technical Field

The present disclosure relates to controlling a switching power converter to reduce distortion of the output voltage waveform of the power converter when transitioning to low-load or no-load conditions.

2. Description of the Related Arts

The efficiency demands placed on portable electronic devices create challenges for regulating power under changing load conditions. These challenges include consuming nearly no power in standby mode, while delivering full power when the device is suddenly plugged-in for active power mode operation. And for many battery operated devices, these demands for power savings increasingly focus on low-load and no-load energy savings.

To address these challenges many portable electronic devices use switching power regulators that operate in different operating modes based on load conditions. For example, a switching power converter typically uses PWM (pulse width modulation) during heavy load conditions and PFM (pulse frequency modulation) during light load conditions. PWM operation mode is generally more efficient than PFM operation mode at higher load conditions where dynamic losses, including conduction losses and switching losses, dominate. On the other hand, PFM operation mode is generally more efficient than PWM operation mode at lower load conditions where static losses such as quiescent current drawn by the switching power converter dominate. Using these techniques, multi-mode switching power converters offer improved efficiency over a wider range of load conditions.

But, using multi-mode operation may introduce distortions in the output voltage caused by switching from one mode to another. These distortions may result from discontinuity in the regulation of the switching power converter at the transition point between different operating modes. Discontinuities may arise, for example, when the control voltage requirements from the two operating modes differ at the transition point. These differences may create an undesired amount of output voltage ripple at the transition point. Further, without knowledge of transformer characteristics of the switching power converter, it may even be difficult to predetermine the transition point depending on the operating mode used to regulate the power on either side of the transition point (i.e., boundary).

SUMMARY

Embodiments include a power regulation approach for transitioning from a first operating mode to a second operating mode by determining the operating conditions at the transition point using a point where the switch would have been turned on if operating under the first operating mode as a reference point to determine when to turn on the switch under the second operating mode. Using the reference point, the switching power converter determines a control period for regulating the switching period of the switch in a second operating mode. In one embodiment, the reference point coincides with the end of the off duration of the switch in the first operation mode. Using the reference point, the switching power converter can determine the operating conditions at the transition and, thus, transition smoothly from a first operating mode, such as VMS (valley mode switching), to another operating mode such as PFM. Using this reference point to determine when to turn on the switch under the second operating mode also allows the controller to regulate the transition to PFM operation mode across all operating conditions agnostic to transformer characteristics, and in a manner that reduces unwanted output voltage ripple that could be undesirable during the transition.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present disclosure can be readily understood by considering the following detailed description in conjunction with the accompanying drawings.

DETAILED DESCRIPTION OF EMBODIMENTS

The Figures (FIG.) and the following description relate to preferred embodiments of the present disclosure by way of illustration only. It should be noted that from the following discussion, alternative embodiments of the structures and methods disclosed herein will be readily recognized as viable alternatives that may be employed without departing from the principles of the present disclosure.

Reference will now be made in detail to several embodiments of the present disclosure, examples of which are illustrated in the accompanying figures. It is noted that wherever practicable similar or like reference numbers may be used in the figures and may indicate similar or like functionality. The figures depict embodiments of the present disclosure for purposes of illustration only. One skilled in the art will readily recognize from the following description that alternative embodiments of the structures and methods illustrated herein may be employed without departing from the principles of the embodiments described herein.

Example Switching Power Converter Circuit

Figure 1:
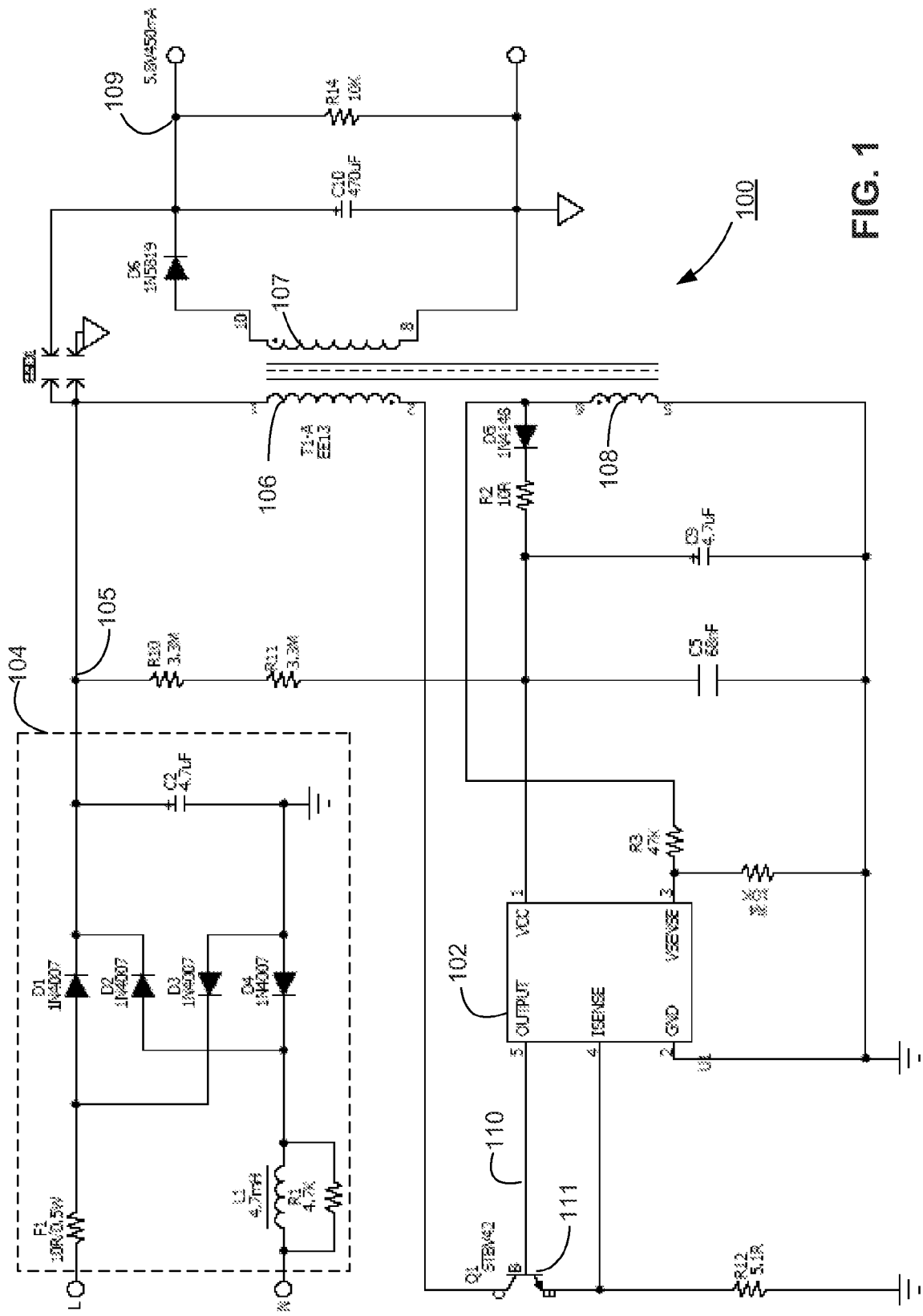
FIG. 1 is a circuit diagram illustrating a switching power converter, according to one embodiment.

FIG. 1 is a circuit diagram illustrating a switching power converter 100, according to one embodiment. Switching power converter 100 is a primary-side feedback flyback converter, and includes three principal sections, i.e., a front end 104, power stage, and a secondary stage. The front end 104 is connected to an AC voltage source (not shown) at nodes L, N, and includes a bridge rectifier comprised of inductor L1, resistors R1, F1, diodes D1, D2, D3, D4, and capacitor C2. The rectified input line voltage at node 105 is input to the supply voltage pin Vcc (pin 1) of controller IC 102 via resistors R10 and R11. The line voltage at node 105 is also connected to the primary winding 106 of power transformer T1-A. Capacitor C5 removes high frequency noise from the rectified line voltage. The output of the front end section at node 105 is an unregulated DC input voltage.

The power stage includes power transformer T1-A, switch 111, and controller IC 102. Power transformer T1-A includes a primary winding 106, a secondary winding 107, and an auxiliary winding 108. Controller IC 102 maintains output regulation via control of the ON and OFF states of switch 111. The ON and OFF states of switch 111 are controlled via a control signal 110 output from the OUTPUT pin (pin 5) of controller IC 102, Control signal 110 drives the base (B) of switch 111. The collector (C) of switch 111 is connected to primary winding 106, while the emitter (E) of switch 111 is connected to $I_{SENSE}$ pin (pin 4) of controller IC 102 and to ground via sense resistor R12. $I_{SENSE}$ pin senses the current through the primary winding 106 and BJT switch 111 Q1 in the form of a voltage across sense resistor R12, Controller IC 102 employs the modulation technique (i.e., operation modes) as described below in detail with reference to FIGS. 2A-2C to control the ON and OFF states of switch 111, the duty cycles of switch 111, and the amplitude of switch 111 base current in accordance with varying load conditions at node 109. The GND pin (pin 2) of controller IC 102 is connected to ground. While a BJT switch Q1 is used as switch 111 in the embodiment of FIG. 1, a power MOSFET may also be used as switch 111 for the switching power converter 100 according to other embodiments herein.

The secondary stage includes diode D6 functioning as an output rectifier and capacitor C10 functioning as an output filter. The resulting regulated output voltage Vout at node 109 is delivered to the load (not shown) and a pre-load resistor R14. The pre-load resistor R14 stabilizes the output of the power converter at no load conditions. Also, ESD (Electrostatic Discharge) gap (ESD1) is coupled between primary winding 106 and diode D6.

The output voltage Vout at node 109 is reflected across auxiliary winding 108, which is input to the $V_{SENSE}$ pin (pin 3) of controller IC 102 via a resistive voltage divider comprised of resistors R3 and R4. Also, although controller IC 102 is powered up by the line voltage 105 at start-up, controller IC 102 is powered up by the voltage across auxiliary winding 108 after start-up and in normal operation. Thus, diode D5 and resistor R2 form a rectifier for rectifying the voltage across auxiliary winding 108 for use as the supply voltage input to the $V_{CC}$ pin (pin 1) of controller IC 102 after start-up and during normal operation. Capacitor C9 is used to store energy from the line voltage at node 105 at start-up or from the voltage across auxiliary winding 108 after start-up between switching cycles.

Adaptive Mode Transition

Figure 2A:
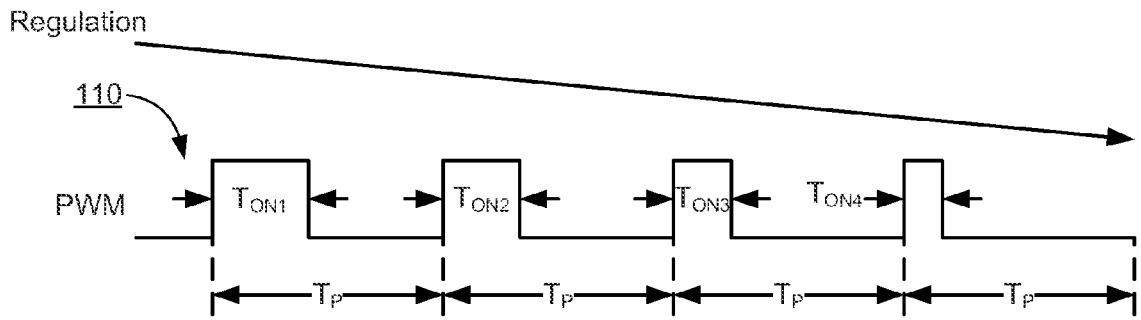
FIG. 2A illustrates an operational waveform for the switching power converter of FIG. 1 in a PWM operating mode, according to one embodiment.
Figure 2B:
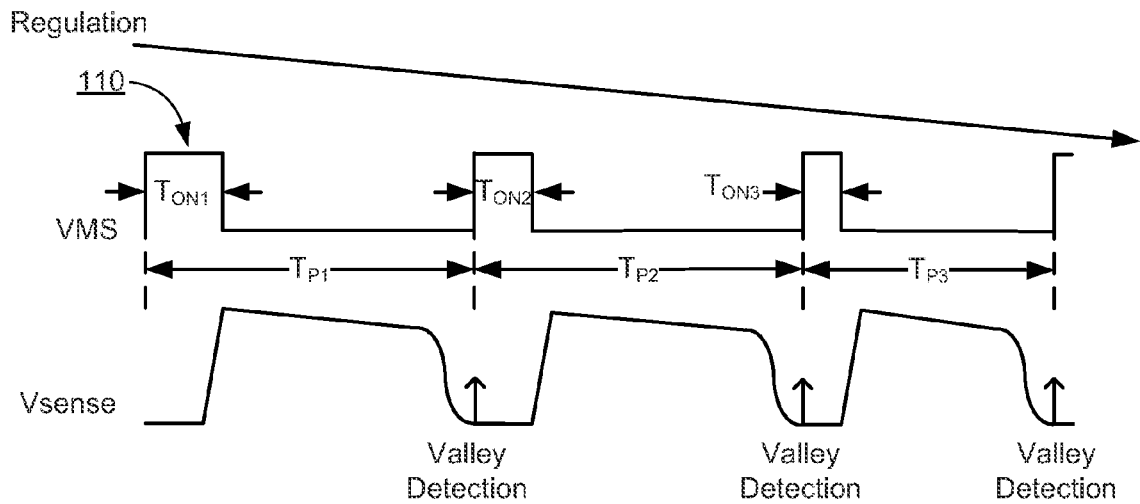
FIG. 2B illustrates an operational waveform for the switching power converter of FIG. 1 in a VMS operating mode, according to one embodiment.
Figure 2C:
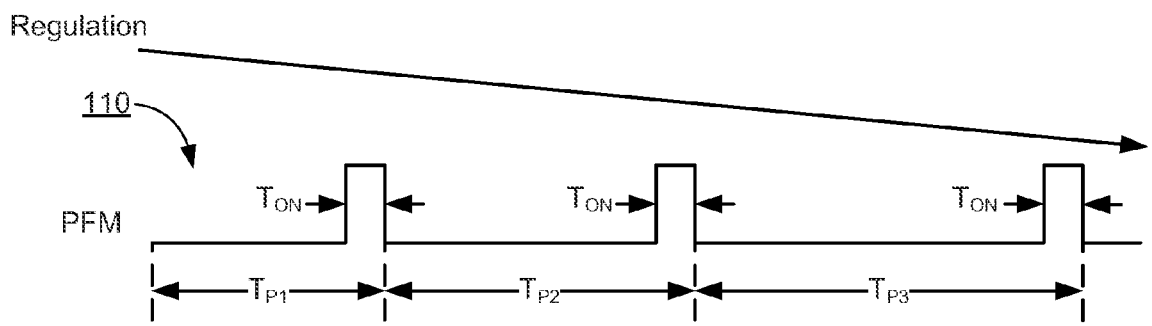
FIG. 2C illustrates an operational waveform for the switching power converter of FIG. 1 in a PFM operating mode, according to one embodiment.

FIGS. 2A-2C illustrate operational waveforms for the switching power converter of FIG. 1 in various operating modes, including PWM (Pulse Width Modulation), VMS (Valley Mode Switching), and PFM (Pulse Frequency Modulation) operation modes. To improve the light load efficiencies of switching power converters, multiple modulation modes are used to regulate the switching power converter at different output current (load) conditions. Generally, for each of these operating modes, the switching power converter of FIG. 1 regulates the duty cycle of a control signal applied to the switch Q1, included in the switching power converter, in a particular manner. The duty cycle refers to the fraction (often expressed as a percentage) of the switching period during which the switch Q1 is turned ON.

For example, to optimize the power efficiency under heavy-load conditions, switching power converter 100 may regulate the output voltage of controller IC 102 using PWM in one embodiment or VMS in another embodiment. In PWM operation mode, the duty cycle of the switch is varied by adjusting how long the switch remains ON (i.e., the conduction pulse width) during each switching period, i.e., using the on-time of switch Q1 as the control variable, while the switching period remains constant. For example, in PWM operation mode, the switch may be turned ON at a switching frequency of 100 kHz (and therefore has a switching period of 10 µs). For a duty cycle of 30%, the switch Q1 is controlled to be ON for 3 µs and OFF for 7 µs of each switching period.

As shown in FIG. 2A, in PWM operation mode, controller IC 102 regulates the output voltage of the switching power converter 100 by varying the conduction pulse width ($T_{ONx}$) of control signal 110 (and thus the on-time of switch Q1), while keeping the switching period ($T_P$) (equal to the inverse of the switching frequency) constant. As the regulation decreases (i.e., the load decrease), controller IC 102 reduces the conduction pulse width from $T_{ON1}$ to $T_{ON4}$ to reduce the output voltage. Decreasing the conduction pulse width applied to switch 111 causes less energy to be transferred per switching cycle to primary winding 106 of power transformer T1-A, which in turn decreases the output voltage of switching power converter 100. Conversely, as the regulation increases (i.e., the load increases), controller IC 102 increases the conduction pulse width applied to switch 111 to increase the output voltage of switching power converter 100. Increasing the conduction pulse width of switch 111 transfers more energy per cycle to the primary winding 106 of power transformer T1-A, which in turn increases the output voltage of the switching power converter 100.

As shown in FIG. 2B, in VMS operation mode, the duty cycle of switch 111 is varied by adjusting both the conduction pulse width and switching period of the control signal 110. Specifically, in VMS operation mode, the conduction pulse width (i.e., $T_{ONx}$) is varied in accordance with PWM, PFM, or other suitable converter control schemes (i.e., operation modes). The switching period is not predetermined, but instead varies, because the switch is turned on at a valley (local minimum) of V sense signal that occurs immediately subsequent or otherwise subsequent to the desired switch turn on time as calculated by the employed operation mode (PWM or PFM) as further described in FIG. 3. As previously discussed in conjunction with FIG. 1, the signal $V_{SENSE}$ represents the output voltage Vout at node 109 as reflected across auxiliary winding 108. Accordingly, the VMS operation mode and associated techniques described herein can benefit switching power converter 100 that uses any control scheme, regardless of whether PWM or PFM or some other operation mode is used.

Figure 3:
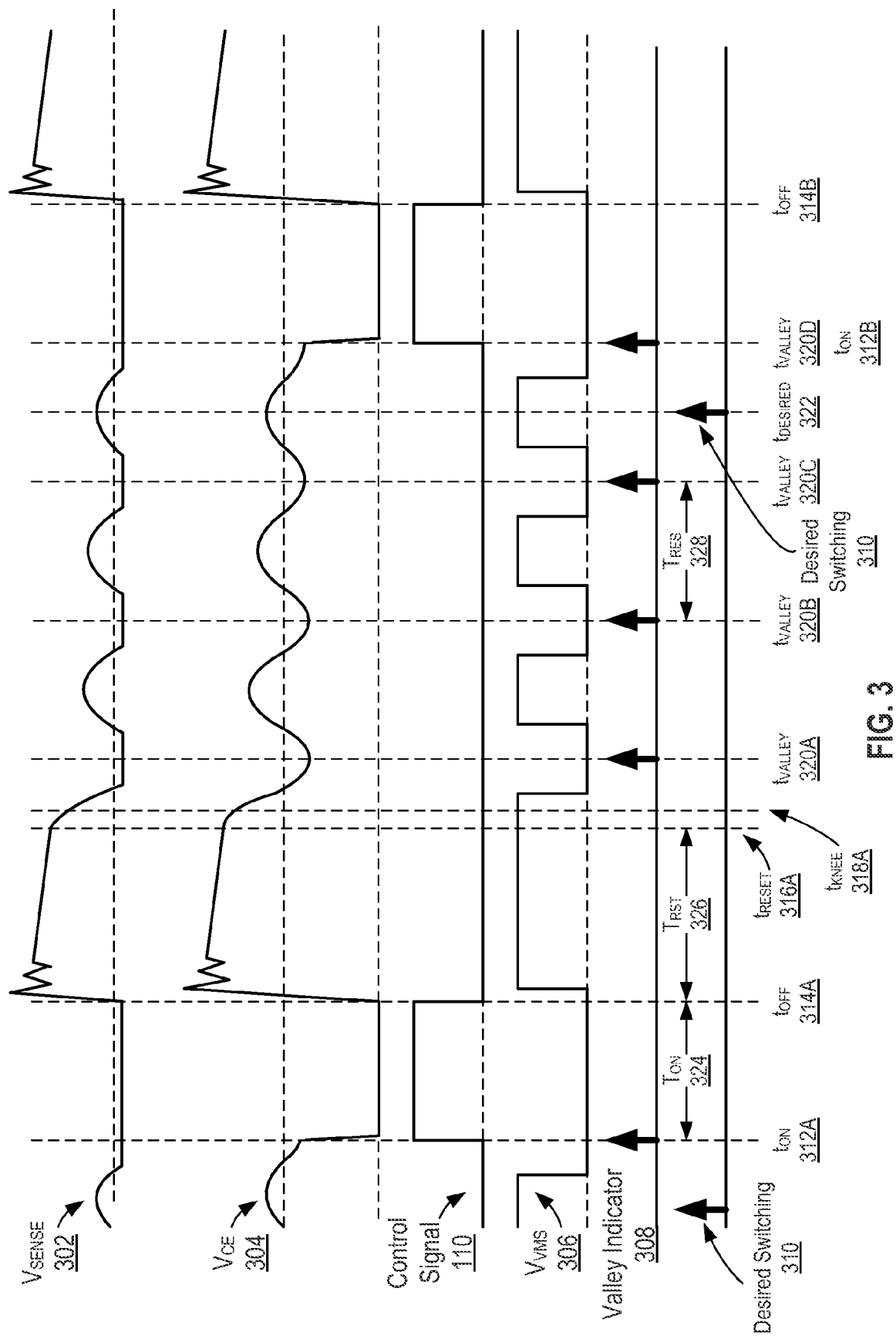
FIG. 3 illustrates the operation of the switching power converter of FIG. 1 in VMS operation mode according to one embodiment.

FIG. 3 illustrates the operation of the switching power converter of FIG. 1 in VMS operation mode according to one embodiment. Under VMS operation mode for a given switching cycle of switching power converter 100, controller IC 102 determines a desired switch turn-on time based on pulse width modulation (PWM), pulse frequency modulation (PFM), or other suitable converter control schemes (i.e., operation mode). Also, controller IC 102 predicts one or more times corresponding to local minimums (valleys) for the voltage across switch 111. Switch 111 is then turned on at a valley predicted to occur immediately subsequent or otherwise subsequent to the desired switch time determined according to the operation mode.

For example, as shown in FIG. 1, $V_{SENSE}$ 302 represents the voltage on the VSENSE pin (pin 3) of controller IC 102. $V_{CE}$ 304 represents the voltage across switch 111. Hence, in the embodiment illustrated by FIG. 1 wherein the switch 111 is a BJT, $V_{CE}$ 304 is the voltage between the collector and the emitter of BJT switch 111. In other embodiments (not shown), switch 111 can be a power MOSFET, in which case $V_{CE}$ 304 would correspond to the voltage between the drain of the power MOSFET and the source. As can be seen from the schematic of FIG. 1, $V_{SENSE}$ 302 is substantially proportional to the voltage across the auxiliary winding 108 of the transformer. $V_{SENSE}$ 302 and $V_{CE}$ 304 exhibit nearly identical timing characteristics. As described above, control signal 110 represents the voltage on the OUTPUT pin (pin 5) of controller IC 102. Switch 111 is ON (closed) when control signal 110 is HIGH and switch 111 is OFF (open) when control signal 110 is LOW. $V_{VMS}$ 306, valley indicator pulses 308, and desired switch pulses 310 are timing signals internal to controller IC 102 whose generation and significance are detailed below in reference to FIG. 3.

At time $t_{ON}$ 312A, controller IC 102 generates control signal 110 to be HIGH, turning on (closing) switch 111. Switch 111 remains closed until time $t_{OFF}$ 314A, when control signal 110 becomes LOW pursuant to the operation of controller IC 102. The particular timings of $t_{ON}$ 312A and $t_{OFF}$ 314A are determined by the particular operation mode (PWM or PFM) employed in switching power converter 100, as explained with reference to FIG. 2A for PWM operation mode, and as will be explained with reference to FIG. 2C for PFM operation mode. While switch 111 is closed from time $t_{ON}$ 312A to time $t_{OFF}$ 314A, referred to herein as the ON-time (conduction pulse width or ON-period of switch 111) $T_{ON}$ 324, the rectified DC input voltage $V_{IN}$ 105 is applied to primary winding 106 and the current through primary winding 106 increases. During the ON-time $T_{ON}$ 324, the voltage across auxiliary winding 108 is characterized by the mathematical expression $$V_X = -\frac{N_X}{N_1} V_{IN},$$

wherein $N_X$ is the number of turns for auxiliary winding 108, $N_1$ is the number of turns for primary winding 106, $V_{IN}$ is the rectified DC input voltage at node 105, and $V_X$ is the voltage across auxiliary winding 108.

Referring back to FIG. 3, at time $t_{OFF}$ 314A, control signal 110 goes LOW, causing switch 111 to open and suddenly interrupt the current through primary winding 106. The current through primary winding 106 stays at zero until the end of the OFF period of switch 111, i.e., until controller IC 102 turns on switch 111 again at time $t_{ON}$ 312B as will be explained in more detail below. As shown by FIG. 3, this sudden change in current results in high-frequency parasitic ringing for both $V_{SENSE}$ 302 and $V_{CE}$ 304 immediately following time $t_{OFF}$ 314A. The high-frequency parasitic ringing results from resonance between the transformer leakage inductance and the parasitic capacitance seen from the collector and emitter of BJT switch 111 in parallel with the equivalent parallel parasitic capacitance of primary winding 106, and typically dies out quickly. After the high-frequency parasitic ringing dies out, $V_{SENSE}$ 302 and $V_{CE}$ 304 remain almost flat until the transformer resets, shown in FIG. 3 as time $t_{RESET}$ 316A.

The duration between $t_{OFF}$ 314A and $t_{RESET}$ 316A is referred to herein as the transformer reset period ($T_{RST}$) 326. During the transformer reset period $T_{RST}$ 326, diode D6 conducts and the voltage across secondary winding 107 approximately equals the output voltage at node 109 ($V_O$) (the forward voltage drop across diode D6 can be considered negligible for the purpose of illustrative clarity). Accordingly, the voltage across primary winding 106 ($V_1$) can be expressed in terms of the output voltage 109 ($V_O$) as $$V_1 = \frac{N_1}{N_2} V_O,$$

and the voltage across auxiliary winding 108 ($V_X$) can be expressed as $$V_X = +\frac{N_X}{N_2} V_O,$$

wherein $N_1$, $N_2$, and $N_X$ are the number of turns for primary winding 106, secondary winding 107, and auxiliary winding 108, respectively. During the transformer reset time $T_{RST}$ 326, $V_{SENSE}$ 302 follows the voltage across auxiliary winding 108 according to the scaling factor set by the voltage divider comprised of resistors R3 and R4 as shown in FIG. 1. Meanwhile, $V_{CE}$ 304 is given by the expression $$V_{CE} = \frac{N_1}{N_2} V_O + V_{IN},$$

wherein $V_{IN}$ is again the rectified DC input voltage at node 105.

The transformer reset time $T_{RST}$ 326 is dictated by the volt-second-balance requirement for resetting the transformer core and can vary between switching cycles based on fluctuations in load and other factors within switching power converter 100. At $T_{RESET}$ 316A (the end of the transformer reset time $T_{RST}$ 326), diode D6 stops conducting, causing the transformer magnetizing inductance and therefore $V_{SENSE}$ 302 and $V_{CE}$ 304 to resonate, a phenomenon referred to herein as transformer ringing. The resonant frequency ($f_{RES}$) and resonant period ($T_{RES}$) 328 of ringing for $V_{SENSE}$ 302 and $V_{CE}$ 304 due to transformer ringing is determined by the parasitic capacitance seen from the collector and the emitter of BJT switch 111 in parallel with the equivalent parallel parasitic capacitance of primary winding 106. In other implementations that employ a power MOSFET as switching device (i.e., switch 111), the resonant frequency ($f_{RES}$) and resonant period ($T_{RES}$) 328 of ringing for $V_{SENSE}$ 302 and $V_{CE}$ 304 due to transformer ringing is determined by the parasitic capacitance seen from the drain to the source of the power MOSFET switch in parallel with the equivalent parallel parasitic capacitance of primary winding 106. Due to various damping and loss factors within switching power converter 100, $V_{SENSE}$ 302 and $V_{CE}$ 304 are decaying sinusoidal signals with resonant period $T_{RES}$ 328.

As shown in FIG. 3, the ringing-induced voltage oscillations cause $V_{SENSE}$ 302 and $V_{CE}$ 304 to periodically approach or reach local minimum voltages and local maximum voltages. When the OFF time for switch 111 is long relative to the resonant period $T_{RES}$ 328, eventually the transformer ringing decays completely and $V_{CE}$ 304 settles at $V_{IN}$ 105, wherein $V_{IN}$ 105 is again the rectified DC input voltage at node 105. Times at which $V_{CE}$ 304 reaches a local minimum as a result of transformer ringing are referred to herein as valleys 320A, 320B . . . 320D. For example, FIG. 3 illustrates a first valley 320A, a second valley 320B, a third valley 320C, and a fourth valley 320D. Although four valleys are shown in FIG. 3, there can be more or less than four valleys before switch 111 is turned ON again at $t_{ON}$ 312B.

Unlike the VMS operation mode implemented by controller IC 102, a conventional VMS operation mode would turn on switch 111 (i.e., set control signal 110 HIGH) at the first valley 320A, which is prior to the desired switching timing 310. Therefore, fluctuations in the transformer reset time $T_{RST}$ 326 as well as the ON-time $T_{ON}$ 324 would precipitate changes in the switching frequency of switching power converter 100, and force switching power converter 100 to operate only in a variable switching-frequency control mode, such as a PFM mode.

In contrast, the VMS operation mode implemented by controller IC 102 does not necessarily turn on switch 111 (i.e., set control signal 110 HIGH) at the first valley 320A. Rather, controller IC 102 can turn on the switch 111 at any time after the end of the transformer reset period ($t_{RESET}$ 316A). This turn-on time (shown in FIG. 3 as $t_{ON}$ 312B) is determined according to the operation mode employed by switching power converter 100 (e.g., a PWM, PFM, or other suitable operation mode).

Specifically, controller IC 102 determines a desired switch time $t_{DESIRED}$ 322 in accordance with PWM, PFM, or other operation modes suitable for switching power converter 100. Controller IC 102 determines the desired switch time $t_{DESIRED}$ 322 independently of the transformer reset period or resonant characteristics (e.g., a resonant period of the voltage across the switch) of switching power converter 100. That is, controller IC 102 may determine a desired turn-on time of switch 111 in each switching cycle that is distinct from the actual turn-on time of switch 111. Hence, resonant characteristics of switching power converter 100, including the transformer reset period $T_{RST}$ 326 or the resonant period $T_{RES}$ 328, do not constrain the operation mode implemented by controller IC 102 or influence determination of the desired switch time $t_{DESIRED}$ 322.

Controller IC 102 issues a desired switch pulse 310 at the determined desired switch time $t_{DESIRED}$ 322. In one embodiment, controller IC 102 then sets control signal 110 HIGH at the valley 320D that is predicted to occur immediately subsequent to the desired switch pulse 310, as shown by FIG. 3. For example, to calculate predicted timings at which a local minimum of a voltage across the switch are predicted to occur prior to actual occurrences of the local minimums, controller IC 102 may analyze the resonance characteristics included in the voltage feedback signals. For example, controller IC 102 may perform feature analysis of voltage feedback signals, by examining the timing of the rising and falling edges of $V_{VMS}$ 306 to predict the times at which the valleys 320A, 320B . . . 320D of the voltage $V_{CE}$ 304 across switch 111 may occur. In other embodiments, controller IC 102 may set control signal 110 HIGH at any valley that occurs after the desired switch pulse. Hence, one embodiment of the VMS operation mode according to the embodiments herein advantageously turns on switch 111 while $V_{CE}$ 304 is at a local minimum (i.e., a valley 320A, 320B . . . 320D) without restricting the operation mode or switching frequency utilized by controller IC 102. In other words, controller IC 102 determines the appropriate desired switch time $t_{DESIRED}$ 322 based on the employed operation mode independent of the resonant characteristics of switching power converter 100, and then causes switch 111 to be turned on at the valley 320D immediately following the desired switch time $t_{DESIRED}$ 322.

The VMS operation mode consistent with the embodiments disclosed herein therefore reduces the negative impacts of fluctuations in switching power converter 100 resonance characteristics by employing valley mode switching without interrupting the employed switch operation mode (e.g., PWM, PFM, etc) while still enjoying the benefits of reducing switching loss by switching the switch 111 on at a valley, i.e., when the voltage across the switch 111 is at a local minimum. Accordingly, one benefit of the VMS operation mode implemented by controller IC 102 is the enabling of low-voltage resonance-based switching in conjunction with a PWM operation mode. Another benefit of the VMS operation mode implemented by controller IC 102 is compatibility with switching periods longer than those dictated by transformer reset periods $T_{RST}$ 326, thereby enabling switch 111 to be a slow-switching device such as a BJT.

As shown by FIG. 3, there is a timing delay between the desired switch pulse 310 generated by controller IC 102 at timing $t_{DESIRED}$ 322 and the turn on timing $t_{ON}$ 312B of switch 111 (i.e., control signal 110 going HIGH) at valley 320D. However, the timing delay does not adversely affect operation of switching power converter 100. Resonant periods $T_{RES}$ 328 are typically brief relative to the switching period of switching power converter 100, so the delay between the desired switch pulse 310 and $t_{ON}$ 312B is usually not significant. Furthermore, the small impact of the timing delay is reflected in the output voltage at node 109 and other switching power convert 100 parameters, and therefore the PWM, PFM, or other feedback-based control schemes implemented by controller IC 102 naturally compensates for the timing delay when determining the on-times and off-times for the subsequent switching period. Additionally, the slight fluctuations in timing delay from one switching cycle to the next switching cycle introduce an intrinsic dithering to the switching frequency over time, beneficially reducing switch-produced EMI.

Returning to FIG. 2B, in VMS operation mode, controller IC 102 regulates the output voltage by varying the conduction pulse width (i.e., $T_{ON1}$, $T_{ON2}$, and $T_{ON3}$) of control signal 110, and varying switching period (i.e., $T_{P1}$, $T_{P2}$, and $T_{P3}$) based on the detected valley of the transformer winding voltage. As the regulation decreases, controller IC 102 reduces the conduction pulse width of control signal 110 from $T_{ON1}$ to $T_{ON3}$ as is done with PWM. By reducing the conduction pulse width, switch 111 transfers less energy to primary winding 106 of power transformer T1-A, which in turn decreases the output voltage of switching converter 100. However, since VMS operation mode determines the actual turn-on time at the valley of the $V_{SENSE}$ signal that occurs subsequent to the desired turn-on time calculated based on PWM, the actual turn-on time would vary randomly depending on the ringing in $V_{SENSE}$, thereby varies the switching period too. Thus, in VMS operation, the on-time of switch 111 varies as the control variable, and the switching period varies as determined by valley turn-on decision.

In PFM operation mode, the duty cycle of switch 111 is varied by keeping the conduction pulse width of the control signal 110 constant, while varying the switching period and thus the switching frequency. For example, in PFM operation mode, a switch may be turned on for 5 μs of each switching period, but the switching frequency may be varied between 40 kHz and 130 kHz. A switching frequency of 40 kHz corresponds to a switching period of 25 μs, and therefore, the duty cycle at this switching frequency is 20% (=0.5 μs/25 μs). For a switching frequency of 130 kHz, the switching period is 7.7 μs, and therefore, the duty cycle at 130 kHz is 65% (=5 μs/7.7 μs).

As shown in FIG. 2C, in PFM operation mode, controller IC 102 regulates the output voltage by varying the switching period (i.e., $T_{P1}$, $T_{P2}$, and $T_{P3}$) of control signal 110, while keeping the pulse conduction width ($T_{ON}$) of control signal 110 constant. As the regulation decreases (i.e., the load decrease), controller IC 102 increases the switching period from $T_{p1}$ to $T_{p3}$ to reduce the output voltage. Increasing the switching period of switch 111 causes less energy to be transferred per unit of time (i.e., reduces the duty cycle) to primary winding 106 of power transformer T1-A, which in turn decreases the output voltage of switching converter 100. Conversely, as the regulation increases (i.e., the load increases), controller IC 102 decreases the switching period to increase the output voltage of switching converter 100. Decreasing the switching period of switch 111 transfers more energy per unit of time to the primary winding 106 of power transformer T1-A (i.e., increases the duty cycle), which in turn increases the output voltage of switching converter 100.

Figure 4:
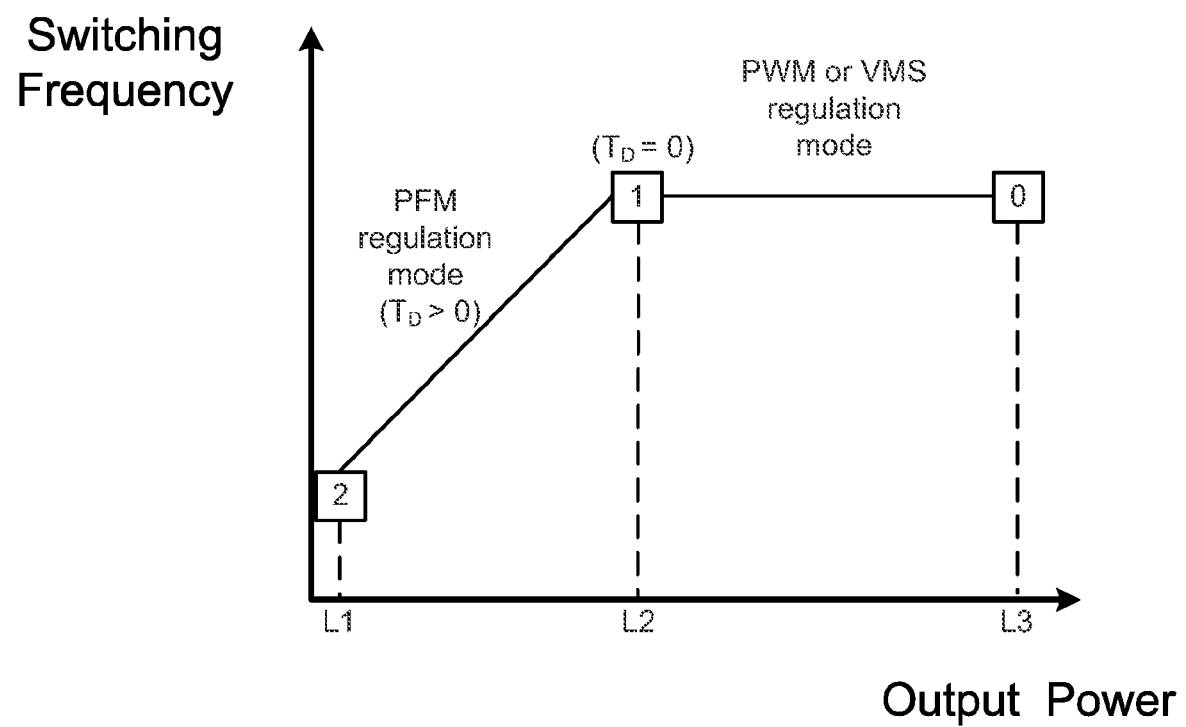
FIG. 4 is a graph illustrating the transition between operation modes of the switching power converter of FIG. 1, according to one embodiment.

FIG. 4 is a graph illustrating the transition between operation modes of the switching power converter of FIG. 1, according to one embodiment. For example, as shown in FIG. 4, controller IC 102 operates switching power converter 100 in PWM operation mode or VMS operation mode when the load is between L2 and L3 (between operating points 1 and 0), but then operates switching power converter 100 in PFM operation mode under low load conditions between load levels L1 and L2 (between operating points 2 and 1). Controller IC 102 operates switching power converter 100 that transitions to PFM operation mode from a non-PFM operation mode (such as PWM or VMS operation mode) at operating point 1 without any discontinuity at the transition point for all operating conditions.

Assuming the switching power converter 100 operates in PWM operation mode under load conditions L2-L3, when switching power converter 100 transitioning from PWM operation mode to PFM operation mode at operating point 1, the value of the on-time ($T_{ON}$) is known because it is the control variable used by controller IC 102 in the PWM operation mode and the value of the switching period ($T_P$) is known because it is kept at a constant value. Thus, switching power converter 100 may start using the switching period ($T_P$) as the control variable for PFM operation mode, using the known value of switching period ($T_P$) at operating point 1, and there would be no discontinuity in transitioning from PWM to PFM operation mode at operating point 1.

On the other hand, if the switching power converter operates in VMS mode under load conditions L2-L3 and needs to transition to PFM operation mode at operating point 1 for low load conditions (L1-L2), the switching period ($T_P$) at operating point 1 is unknown because VMS operation mode turns on switch 111 at a valley point of the $V_{SENSE}$ signal (reflecting the output voltage of switching power converter 100) which exhibits ringing according to the resonance in the magnetic components of switching power converter 100 and thus the valley points are inherently unpredictable. Thus, when transitioning from VMS operation, switching period ($T_P$) at operating point 1 is not a known value to controller IC 102, and thus controller IC 102 would not have information on which switching period ($T_P$) to use as the initial value at operating point 1 to start operating in PFM operation mode under the low load conditions. As a result, controller 102 would have to use a value that will likely be different from the resulting switching period ($T_P$) from VMS operation mode immediately before switching power converter transitions to PFM operation mode at operating point 1. This in turn, would result in a discontinuity in the regulation of the output voltage of switching power converter 100 and undesired ripple of the output voltage at node 109.

Accordingly, to transition without discontinuity from VMS operation mode to PFM operation mode at operating point 1, controller IC 102 defines a regulation variable $T_d$ (dead time), which serves as a reference point to determine when to turn on switch 111 at the boundary (i.e., operating point 1) and during PFM operation mode. $T_d$ serves as the control variable to control the switching period under all the operation modes including, PWM, VMS, and PFM. The reference point where $T_d=0$ means the switch 111 is turned on at the desired on-time calculated by the employed operation mode, whether that is PWM or PFM. At the transition point from VMS to PFM operation mode at operating point 1, $T_d=0$ represents the point where switch 111 would have been turned on under the previous operation mode (VMS or PWM) prior to transitioning to PFM operation mode. For example, if controller IC 102 uses a VMS operation mode between operating point 0 and operating point 1, the reference point could be the valley point determined to be the actual turn-on-time immediately before transitioning to PFM operation mode at operating point 1. That valley point is set at $T_d=0$ and then the switching power converter uses $T_d$ as the control variable from then on to control the switching power converter in PFM operation mode. Since the dead time $T_d$ is used and such dead time $T_d$ was set to be a known value at the transition point (operating point 1), the switching power converter does not experience discontinuity in the regulation of the output voltage of switching power converter 100 and undesired ripple of the output voltage at node 109.

The control period represents that amount of time controller IC 102 extends the switching period beyond the reference point (i.e., $T_d=0$) when operating in PFM operation mode. Under PFM operation mode, controller IC 102 turns on switch 111 at the end of the control period, causing energy to be transferred to primary winding 106 of power transformer T1-A. For example, returning to FIG. 4, as load levels decrease from L2 to L1, controller IC 102 regulates the duty cycle by increasing $I_d$ (from $T_d=0$ at operating point 1), which in turn increases the control period, and thus the switching period. And by increasing the switching period, controller IC 102 causes less energy to be transferred to primary winding 106 of power transformer T1-A, which reduces the output power level of switching power converter 100.

Thus, by regulating the transition between operating modes using the dead time $T_d$, controller IC 102 can regulate a continuous transition to PFM operation mode from any other type of switch regulation operation mode across all operating conditions independent of transformer characteristics. That is, unlike other controllers, controller IC 102 can determine the switching period to use at the transition point to PFM operation mode without knowledge of the turns ratio, magnetizing inductance, transformer reset period, or other characteristics that affect the switching period during PFM operation mode.

Figure 5:
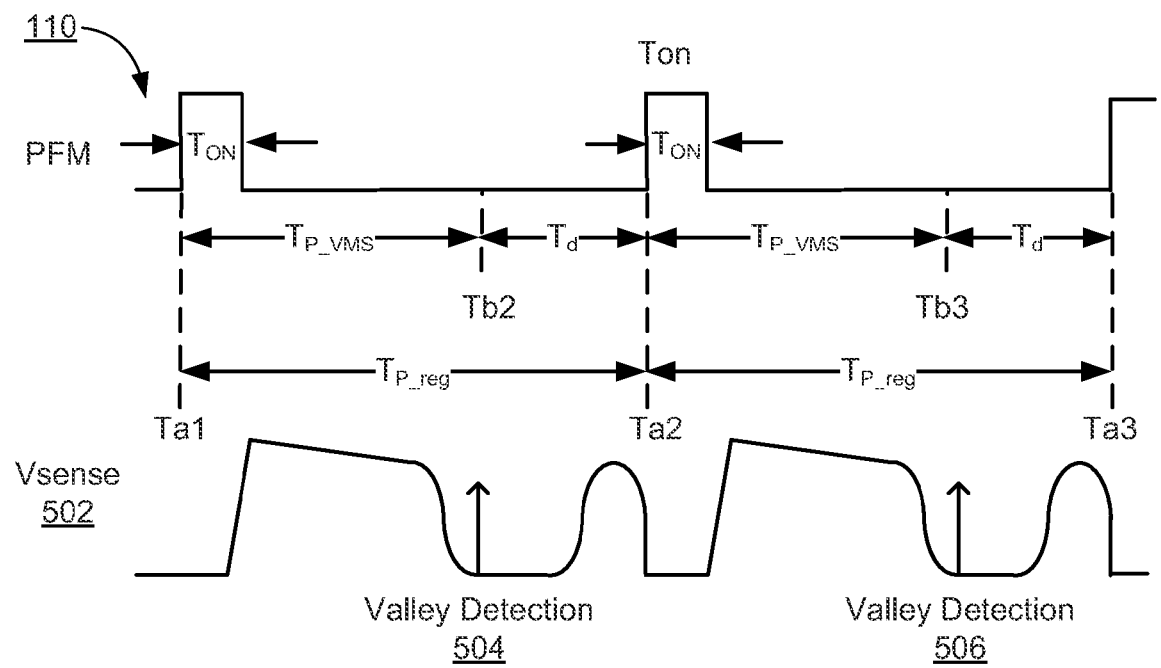
FIG. 5 illustrates operational waveforms of the switching power converter of FIG. 1 for regulating the switching period when transitioning to a PFM operating mode using dead time ($T_d$) as a control variable, according to one embodiment.

FIG. 5 illustrates operational waveforms of the switching power converter of FIG. 1 for regulating the switching period for transitioning to a PFM operating mode using dead time ($T_d$) as a control variable, according to one embodiment. For example, FIG. 5 shows an operational waveform of switching power converter 100 under PFM operation mode using $T_d$ as control variable to regulate the switching period $T_{P\_reg}$, where $T_d$ is based on when controller IC 102 would have turned on switch 111 under VMS operation mode (or some other operation mode immediately before transitioning to PFM). $T_{ON}$ represents the conduction pulse width of switch 111 under PFM operation mode, and $T_{P\_reg}$ represents switching period under PFM operation mode. Under normal PFM operation mode, switch 111 turns on at times $T_{a1}$, $T_{a2}$, and $T_{a3}$. But when transitioning to PFM operation mode, the initial switching period to use at the transition point (operating point 1 in FIG. 4) is unknown because controller 102 does not have information of the switching period $T_{P\_reg}$ in the switching cycle immediately prior to the transition period due to the fact that the switching period was dictated by when the valley occurred in VMS operation mode. And the timing when the valley occurred in VMS operation mode depends on the unpredictable magnetic characteristics of switching power converter that controller IC 102 does not have information on.

So, to determine when to turn on switch 111 at the transition point to PFM operation mode from another operation mode (e.g., VMS operation mode), controller IC 102 uses the time that switch 111 would have been turned on in the previous operation mode to define a reference point. Here, using VMS operation mode as the previous mode, switch 111 would have been turned on at valley detection points 504 and 506, which correspond to the hypothetical switch turn on times of $T_{b2}$ and $T_{b3}$, respectively, under the previous VMS operation mode. And thus, the switching period under VMS operation mode is represented by $T_{P\_VMS}$, as the time period from $T_{a1}$ to $T_{b2}$ for one switching cycle, and $T_{a2}$ to $T_{b3}$, for the subsequent switching cycle. The difference between $T_{P\_reg}$ and $T_{P\_VMS}$ represents the control variable $T_d$, which corresponds to the amount of time controller IC 102 extends the switching period beyond the reference point (i.e., $T_d=0$) where switch 111 would have been turned on in the previous mode. Accordingly, by defining dead time ($T_d$) as a control variable, controller IC 102 can determine the operating conditions at the transition point to PFM operation mode from any non-PFM operation mode. By determining the operation conditions at the transition point, control IC 102 allows a continuous transition to PFM operation mode across all operating conditions, agnostic to the transformer characteristics of the switching power converter.

Upon reading this disclosure, those of skill in the art will appreciate still additional alternative designs for switching power converters. For example, although the controller IC 102 and its application circuit shown in FIG. 1 are based on the primary-side feedback control of flyback converters, the same principles of this disclosure are also applicable to alternative designs based on the secondary-side feedback control. Similar principles can be used with boost type switching power converters or switching power converters with other topologies. Thus, while particular embodiments and applications of the present disclosure have been illustrated and described, it is to be understood that the disclosure is not limited to the precise construction and components disclosed herein and that various modifications, changes and variations which will be apparent to those skilled in the art may be made in the arrangement, operation and details of the method and apparatus of the present disclosure disclosed herein without departing from the spirit and scope of the present disclosure.

What is claimed is:

1. A switching power converter comprising:
   a transformer including a primary winding coupled to an input voltage and a secondary winding coupled to an output of the switching power converter;
   a switch coupled to the primary winding of the transformer, current through the primary winding being generated while the switch is turned on and not being generated while the switch is turned off; and
   a controller configured to generate a control signal to turn on or turn off the switch, the switch being turned on responsive to the control signal being in a first state and the switch being turned off responsive to the control signal being in a second state, wherein:
   responsive to a load level at the output of the switching power converter being less than a first load level but greater than a second load level, the second load level being less than the first load level, the controller is further configured to generate the control signal based on a first operation mode, during the first operation mode the switching power converter regulating a duty cycle of the control signal applied to the switch by performing one of:
      varying a conduction pulse width of the control signal and keeping a switching period of the control signal constant, or
      varying the conduction pulse width of the control signal and varying the switching period of the control signal;
   responsive to the load at the output of the switching power converter being less than the second load level but greater than a third load level, the third load level being less than the second load level, the controller is further configured to generate the control signal based on a second operation mode, during the second operation mode the switching power converter regulating the duty cycle of the control signal applied to the switch by keeping the conduction pulse width constant and varying the switching period; and
   wherein at a transition point between the first operation mode and the second operation mode, the controller is further configured to use a point during the first operation mode when the switch would have been turned on prior to transitioning to the second operation mode as a reference point to determine when to turn on the switch during the second operation mode.

2. The switching power converter of claim 1, wherein in the second operation mode, the controller is further configured to turn on the switch at an end of a control period, the control period representing an amount of time that the controller extends the switching period beyond the reference point when operating in the second operation mode.

3. The switching converter of clam 1, wherein the first operation mode is a valley mode switching operation mode.

4. The switching converter of clam 1, wherein the first operation mode is a pulse width modulation operation mode.

5. The switching converter of clam 1, wherein the reference point is determined in accordance with valley mode switching operation mode.

6. The switching converter of clam 1, wherein the reference point is determined in accordance with pulse width modulation operation mode.

7. The switching converter of claim 1, wherein the reference point coincides with the end of the off duration of the switch in the first operation mode.

8. A method of controlling a switching power converter, the switching power converter including a transformer with a primary winding coupled to an input voltage and a secondary winding coupled to an output of the switching power converter, and a switch coupled to the primary winding of the transformer, current in the primary winding being generated while the switch is turned on and not being generated while the switch is turned off, the method comprising:

generating a control signal to turn on or turn off the switch, the switch being turned on responsive to the control signal being in a first state and the switch being turned off responsive to the control signal being in a second state, wherein:

responsive to a load level at the output of the switching power converter being less than a first load level but greater than a second load level, the second load level being less than the first load level, generating the control signal based on a first operation mode, during the first operation mode the switching power converter regulating a duty cycle of the control signal applied to the switch by performing one of:

varying a conduction pulse width of the control signal and keeping a switching period of the control signal constant, or varying the conduction pulse width of the control signal and varying the switching period of the control signal;

responsive to the load at the output of the switching power converter being less than the second load level but greater than a third load level, the third load level being less than the second load level, generating the control signal based on a second operation mode, during the second operation mode the switching power converter regulating the duty cycle of the control signal applied to the switch by keeping the conduction pulse width constant and varying the switching period; and wherein at a transition point between the first operation mode and the second operation mode, using an operating point during the first operation mode when the switch would have been turned on prior to transitioning to the second operation mode as a reference point to determine when to turn on the switch during the second operation mode.

9. The method of claim 8, wherein during the second operation mode, turning on the switch at an end of a control period, the control period representing an amount of time that the controller extends the switching period beyond the reference point when operating in the second operation mode.

10. The method of clam 8, wherein the first operation mode is a valley mode switching operation mode.

11. The method of clam 8, wherein the first operation mode is a pulse width modulation operation mode.

12. The method of clam 8, wherein the reference point is determined in accordance with valley mode switching operation mode.

13. The method of clam 8, wherein the reference point is determined in accordance with pulse width modulation operation mode.

14. The method of claim 8, wherein the reference point coincides with the end of the off duration of the switch in the first operation mode.

* * * * *